United States Patent
Golla et al.

(10) Patent No.: US 10,139,515 B2
(45) Date of Patent: Nov. 27, 2018

(54) RANGING MEASUREMENTS USING MODULATED SIGNALS

(71) Applicant: Halliburton Energy Services, Inc., Houston, TX (US)

(72) Inventors: Christopher A. Golla, Kingwood, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 64 days.

(21) Appl. No.: 14/890,447

(22) PCT Filed: Jun. 13, 2013

(86) PCT No.: PCT/US2013/045547
§ 371 (c)(1),
(2) Date: Nov. 11, 2015

(87) PCT Pub. No.: WO2014/200483
PCT Pub. Date: Dec. 18, 2014

(65) Prior Publication Data
US 2016/0116623 A1  Apr. 28, 2016

(51) Int. Cl.
*G01V 3/26* (2006.01)
*G01V 3/38* (2006.01)

(52) U.S. Cl.
CPC . *G01V 3/26* (2013.01); *G01V 3/38* (2013.01)

(58) Field of Classification Search
CPC ... G01R 3/26; G01R 3/18; G01R 3/24; G01V 3/38; G01V 3/26; E21B 47/122;
(Continued)

(56) References Cited

U.S. PATENT DOCUMENTS 4,496,969 A * 1/1985 True ............... H04N 9/3108
                                          348/765
4,739,325 A * 4/1988 MacLeod ......... E21B 17/003
                                          324/342
(Continued)

FOREIGN PATENT DOCUMENTS

GB  2481506 A  12/2011
RU  2436924 C2  12/2011
(Continued)

OTHER PUBLICATIONS

International Search Report and Written Opinion issued in related PCT Application No. PCT/US2013/045547 dated Oct. 22, 2013, 12 pages.
(Continued)

*Primary Examiner* — Lee Rodak
(74) *Attorney, Agent, or Firm* — Alan Bryson; Baker Botts L.L.P.

(57) ABSTRACT

A method for performing ranging measurements within a formation includes transmitting an asymmetric time-varying signal from a transmitter (114) disposed within a borehole (106) in the formation. The asymmetric time-varying signal may have a signal characteristic that is based at least in part on a downhole characteristic. A (receiver 110) disposed within the borehole (106) may measure a magnetic field induced on an object (103) within the formation by the asymmetric time-varying signal. A direction to the object (103) from the borehole (106) may be determined based at least in part on the measurement of the induced magnetic field.

16 Claims, 4 Drawing Sheets

(58) Field of Classification Search
CPC ........ E21B 47/12; E21B 47/02; E21B 47/022; E21B 47/024; E21B 47/09; E21B 47/02216; E21B 17/003; E21B 25/10; E21B 7/04; E21B 7/06; E21B 7/061; E21B 7/062
See application file for complete search history.

(56) References Cited

U.S. PATENT DOCUMENTS

| | | | |
|---|---|---|---|
| 4,791,313 A | 12/1988 | Kuckes | |
| 5,258,755 A | 11/1993 | Kuckes | |
| 5,260,662 A | 11/1993 | Rorden | |
| 5,343,152 A | 8/1994 | Kuckes | |
| 5,523,058 A * | 6/1996 | Umemura | A61N 7/02 134/1 |
| 6,044,325 A * | 3/2000 | Chakravarthy | G01V 3/28 702/7 |
| 7,705,598 B2 | 4/2010 | Larsen | |
| 8,596,382 B2 * | 12/2013 | Clark | E21B 43/2406 166/66.5 |
| 2007/0126426 A1 * | 6/2007 | Clark | E21B 47/02216 324/326 |
| 2010/0044108 A1 * | 2/2010 | Bespalov | E21B 47/022 175/24 |
| 2010/0155139 A1 * | 6/2010 | Kuckes | E21B 47/02216 175/45 |
| 2011/0267064 A1 | 11/2011 | Brune et al. | |
| 2011/0298462 A1 * | 12/2011 | Clark | G01V 3/26 324/346 |
| 2011/0308859 A1 * | 12/2011 | Bittar | E21B 47/022 175/45 |
| 2012/0194195 A1 * | 8/2012 | Wisler | E21B 47/02216 324/346 |

FOREIGN PATENT DOCUMENTS

| | | |
|---|---|---|
| RU | 2468200 C2 | 11/2012 |
| WO | 98/45733 A1 | 10/1998 |
| WO | 2009/006975 A2 | 1/2009 |

OTHER PUBLICATIONS

Search Report issued in related Russian Patent Application No. 2015148601 dated Apr. 27, 2017, 4 pages (with translation).
Office Action issued in related DE Application No. 112013007161.4, dated Aug. 16, 2017 (5 pages).

* cited by examiner

RANGING MEASUREMENTS USING MODULATED SIGNALS

CROSS-REFERENCE TO RELATED APPLICATION

The present application is a U.S. National Stage Application of International Application No. PCT/US2013/045547 filed Jun. 13, 2013, which is incorporated herein by reference in its entirety for all purposes.

BACKGROUND

The present disclosure relates generally to well drilling operations and, more particularly, to ranging measurements using modulated signals.

In certain instances, such as in a blowout, it may be necessary to intersect a first well, called a target well, with a second well, called a relief well. The second well may be drilled for the purpose of intersecting the target well, for example, to relieve pressure from the blowout well. Since traditional survey measurements have cones of uncertainty much larger than the size of the target, contacting the target well with the relief well typically requires multiple downhole measurements to identify the precise location of the target well. These downhole measurements may include transmitting a time-varying signal into a formation and measuring any resultant magnetic field that is induced on the target well. Typically, the time-varying signal is a sinusoid. It can be difficult to identify the precise direction of a target well from sinusoidal signal, however, due to sign variations in the resultant magnetic field.

FIGURES

Some specific exemplary embodiments of the disclosure may be understood by referring, in part, to the following description and the accompanying drawings.

Figure 1:
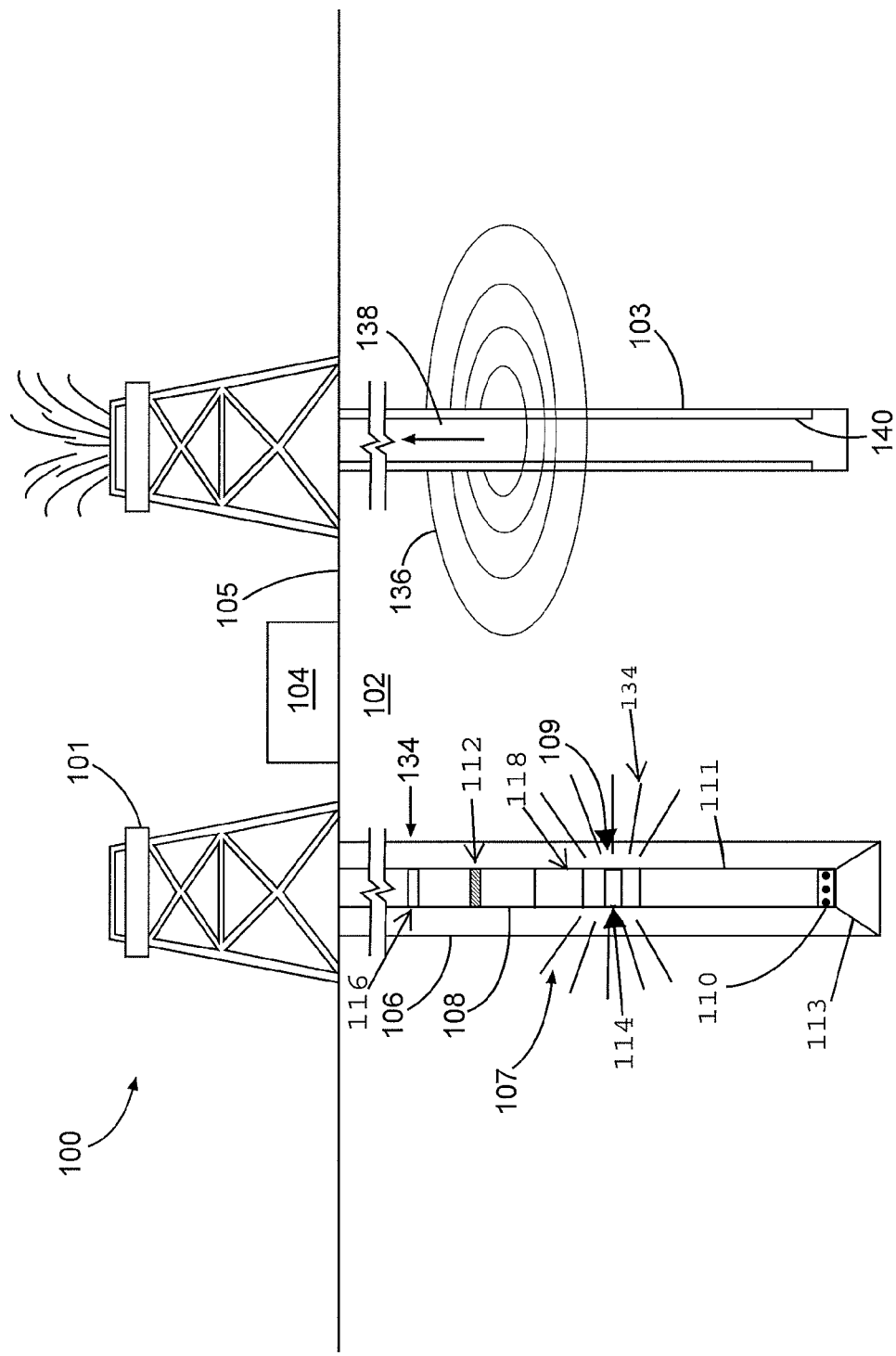
FIG. 1 is a diagram illustrating an example ranging system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to ranging measurements using modulated signals.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Modern petroleum drilling and production operations demand information relating to parameters and conditions downhole. Several methods exist for downhole information collection, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

FIG. 1 is a diagram illustrating an example drilling and ranging system 100, according to aspects of the present disclosure. The system 100 includes rig 101 at the surface 105 and positioned above borehole 106 within a subterranean formation 102. Rig 101 may be coupled to a drilling assembly 107, comprising drill string 108 and bottom hole assembly (BHA) 109. The BHA 109 may comprise a drill bit 113 and an MWD apparatus 111. In certain embodiments, the drilling assembly 107 may be rotated by a top drive mechanism (not shown) to rotate the drill bit 113 and extend the borehole 106. In certain other embodiments, a downhole motor (not shown), such as a mud motor, may be included to rotate the drill bit 113 and extend the borehole 106 without rotating the drilling assembly 107.

The MWD apparatus 111 may comprise at least one receiver 110. As described above, receiver 110 may comprise but is not limited to an induction type sensor, a Hall Effect magnetometer sensor, a magnetic gradiometer or a combination or pair of any of the magnetometers listed above. Likewise, the receiver 110 may be uniaxial, biaxial, or triaxial, and also may be a flux-gate, solenoid, or coil type sensor. In certain embodiments, the receiver 110 may be positioned at various locations within the BHA 109, or above the BHA 109, such as between the drill string 108 and the BHA 109. It may be advantageous to position the receiver 110 as close to the bottom of the hole as possible. For example, in certain embodiments, receiver 110 may be placed in the drill bit 113 rather than in a BHA sub somewhere above the drill bit 113.

Ranging operations may require that a location of a target object be identified. In the embodiment shown, the target object comprises a second borehole 103. The borehole 103 may comprise a target well containing or composed of an electrically conductive member such as casing, liner or a drill string or any portion thereof that has had a blowout or that needs to be intersected, followed or avoided. In the embodiment shown, the borehole 103 includes an electrically conductive casing 140. Identifying the location of the target well 103 may comprise taking various measurements and determining a direction of the target well 103 relative to the borehole 106. These measurements may comprise measurements of electromagnetic fields in the formation using the receiver 110. Magnetic field measurements may identify the distance and direction to the target well 103.

In certain embodiments, performing ranging measurements may include inducing an electromagnetic (EM) field within the second borehole 103. In the embodiment shown, inducing a magnetic field within the borehole comprises transmitting a time-varying signal 134 into the formation 102 using a transmitter 114 coupled to the drilling assembly 107. The time-varying signal 134 may comprise, for example, an alternating current electrical signal. The time-varying signal 134 may be created, for example, from an electrode or a solenoid transmitter. In the embodiment shown, a transmitter 114 injects or induces a time-varying signal 134 within the formation 102. In particular, the drilling assembly 107 includes a gap sub 112 that may allow for the creation of a dipole electric field to be created across the gap sub 112 to aid in flowing current into the formation 102. Time-varying signal 134 may be induced within the formation 102 by energizing the transmitter 114 of the drilling assembly 107 according to a control signal that specifies signal characteristics for the time-varying signal 134. It is noted here that the gap sub 112 is used to the direct the time-varying signal 134 from the transmitter 114 to the receiver 110. However the gap sub 112 may not be required if the transmitter 114 is located far enough away from the receiver 110. For example, in certain embodiments, the transmitter 114 may be located on the order of 10-200 feet from the receiver 110.

Part of the induced time-varying signal 134 may be received and concentrated at the casing 140 within the target well 103, shown as current 138, and the current 138 on the casing 140 may induce a magnetic field 136 in a radial direction from the direction of the flow of the electric current 138. The remaining induced current 134 may return to the drilling assembly 107 at a current return 116 of the drilling assembly 107 below the gap sub 112. The receiver 110 may measure the magnetic field 136 induced by the time-varying signal 134. In other embodiments, as would be appreciated by one of ordinary skill in the art in view of this disclosure, the transmitter 114 may comprise an antenna and the time-varying signal may comprise a time-varying magnetic field that is emitted from the transmitter 114. The time-varying magnetic field may induce a time-varying signal and a resulting secondary time-varying magnetic field in the second borehole 103, which may then be measured by the receiver 110.

A control unit 104 may be positioned at the surface 105 and may be communicably coupled to downhole elements. For example, the control unit 104 may be communicably coupled to the MWD apparatus 111, transmitter 114, drill bit 113, etc through a telemetry system 118. The telemetry system 118 may be incorporated into the BHA 109 and may comprise a mud pulse type telemetry system that transmits information between the surface control unit 104 and downhole elements via pressure pulses in drilling mud. Although the control unit 104 is positioned at the surface 105 in FIG. 1, certain processing, memory, and control elements may be positioned within the drilling assembly 107. Additionally, various other communication schemes may be used to transmit communications to/from the control unit 104, including wireline configurations and wireless configurations.

In certain embodiments, the control unit 104 may comprise an information handling system with at least a processor and a memory device coupled to the processor that contains a set of instructions that when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The time-varying signal 134 generated by the transmitter 114 may be characterized by at least one signal characteristic, including signal frequency, shape, and amplitude, and phase. In certain embodiments, the control unit 104 may control the time-varying signal 134 by transmitting commands corresponding to certain signal characteristics to a downhole controller (not shown) coupled to the transmitter. The commands may cause the downhole controller to generate the time-varying signal 134 using the transmitter 114. In certain other embodiments, the control unit 104 may generate the time-varying signal 134 directly.

In certain embodiments, the signal characteristics may be based at least in part on at least one downhole characteristics within the borehole 106 and formation 102, including a noise level within the formation; a frequency transfer function of the transmitter 114, the receiver 110, and the formation 102; and a frequency response of the object. The noise level within the formation 102 may be measured downhole using electromagnetic or acoustic receivers coupled to the drilling assembly, for example. The frequency transfer function and the frequency response of the target borehole 103 may be determined based on various mathematical models, or may be extrapolated from previous ranging measurements.

In certain embodiments, the control unit 104 may determine or alter the signal characteristics of the time-varying signal 134 based at least in part on the downhole characteristics. For example, the downhole characteristics may be used to determine the signal characteristics of the time-varying signal 134 before the time-varying signal 134 is transmitted from the transmitter 114. Likewise, the signal characteristics may be modified in real-time depending on the resulting induced magnetic field 136 measured at the receiver 110. In certain embodiments, the signal characteristics may be determined or modified by an operator who monitors the quality of the ranging measurements, or by an automated algorithm that selects optimized signal characteristics for different downhole characteristics.

In certain embodiments, the control unit 104 may further send commands to the receiver 110 to cause it to measure the induced magnetic field 136 on the second borehole 103. Like the transmitter 114, the receiver 110 may be coupled to a downhole controller, and the commands from the control unit 104 may control, for example, when the measurements are taken. In certain embodiments, the control unit 104 may determine and set a sampling rate of the induced magnetic field 136, as will be described below. Additionally, measurements taken by the receiver 110 may be transmitted to the control unit 104 via the telemetry system 118. The control unit 104 may determine a distance and direction to the target object, borehole 103 in the embodiment shown, based at least in part on the measurement of the induced magnetic field 136. For example, the control unit 104 may use geometric algorithms to determine the distance and direction of the second borehole 103 relative to the borehole 106.

In certain embodiments, determining the distance and direction of the second borehole 103 relative to the first borehole 106 may be accomplished using the magnetic fields received by the receiver 110. In certain embodiments, the distance and direction determination may be achieved utilizing the relationship in Equation (1) between the pipe current and the received magnetic fields.

$$\overline{H} = \frac{I}{2\pi r}\hat{\phi} \qquad \text{Equation (1)}$$

where H is the magnetic field vector, I is the current on the pipe 140, r is the shortest distance between the receiver 110 and the pipe 140; and $\phi$ is a vector that is perpendicular to both the z-axis of the receiver 110 and the shortest vector that connects the pipe 140 to the receiver 110. Although Equation (1) assumes constant pipe current along the pipe, it can be extended to any current distribution by using the appropriate model.

In certain embodiments, the distance and direction of the second borehole 103 relative to the first borehole 106 may be determined using equations (2) and (3), respectively.

$$r = \frac{I}{2\pi|\overline{H}|} \qquad \text{Equation (2)}$$

$$\Phi = \text{angle}\ (\hat{x}\cdot\overline{H},\ \hat{y}\cdot\overline{H}) + 90 \qquad \text{Equation (3)}$$

where · is the vector inner-product operation. In certain instances, however, equation (2) may be unreliable if a direct or accurate measurement of I is not possible.

When a direct or accurate measurement of I is difficult or impossible, magnetic field gradient measurement may be utilized for the direction and distance determinations. Spatial change in the magnetic field may be measured in a direction that has a substantial component in the radial (r-axis) direction as in Equation (4).

$$\frac{\partial \overline{H}}{\partial r} = -\frac{I}{2\pi r^2}\hat{\phi} \qquad \text{Equation (4)}$$

where $\partial$ is the partial derivative. With this gradient measurement available in addition to an absolute measurement, the distance to the second borehole 103 may be calculated using Equation (5).

$$r = \frac{|\overline{H}|}{\left|\frac{\partial \overline{H}}{\partial r}\right|} \qquad \text{Equation (5)}$$

Figure 3:
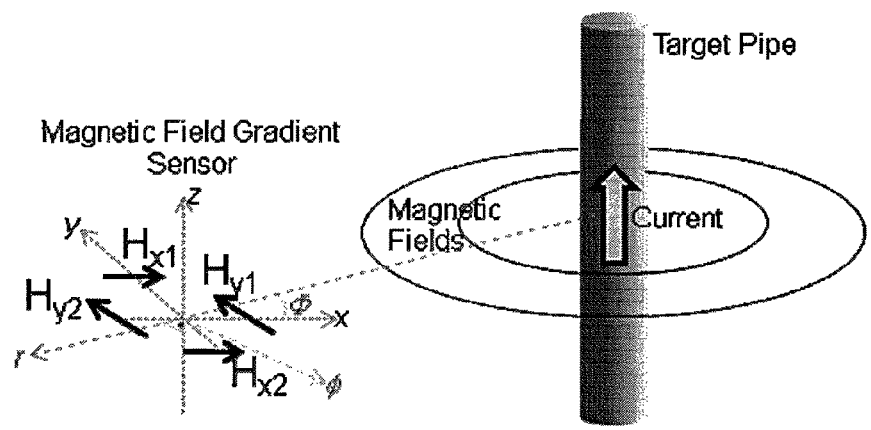
FIG. 3 is a diagram illustrating example gradient measurement components in relation to a target pipe and the magnetic fields produced by currents on the pipe.

In certain embodiments, the gradient field in equation (5) may realized in practice by utilizing finite difference of two magnetic field dipole measurements as shown below in Equation (6):

$$r = \frac{H_y}{\frac{H_y\left(x+\frac{\Delta x}{2},y\right) - H_y\left(x-\frac{\Delta x}{2},y\right)}{\Delta x}} \qquad \text{Equation (6)}$$

where $H_y$ and the gradient measurement components are illustrated in the 4-dipole configuration of FIG. 3 in relation to a target pipe and the magnetic fields produced by currents on the pipe.

In certain embodiments, the time-varying signal 134 also may be used to induce a magnetic field on other target objects within the formation 102. For example, ranging measurements are typically coupled with directional drilling operations to intersect a target well or formation. In certain embodiments, a bent sub may be incorporated into the BHA 109 to establish a directional drilling angle for the drilling assembly 107. The time-varying signal 134 may be used to induce a magnetic field on the portion of the BHA 109 below the bent sub to identify the azimuthal drilling direction.

In certain other embodiments, the time-varying signal 134 may comprise an acoustic signal. Acoustic transmitters may be incorporated into the drilling assembly 107, and may transmit a time-varying acoustic signal into the formation. The target object, such as borehole 103, may reflect some of the time-varying acoustic signal and acoustic receivers at the drilling assembly 107 may receive and measure the reflected acoustic signal.

Figure 2:
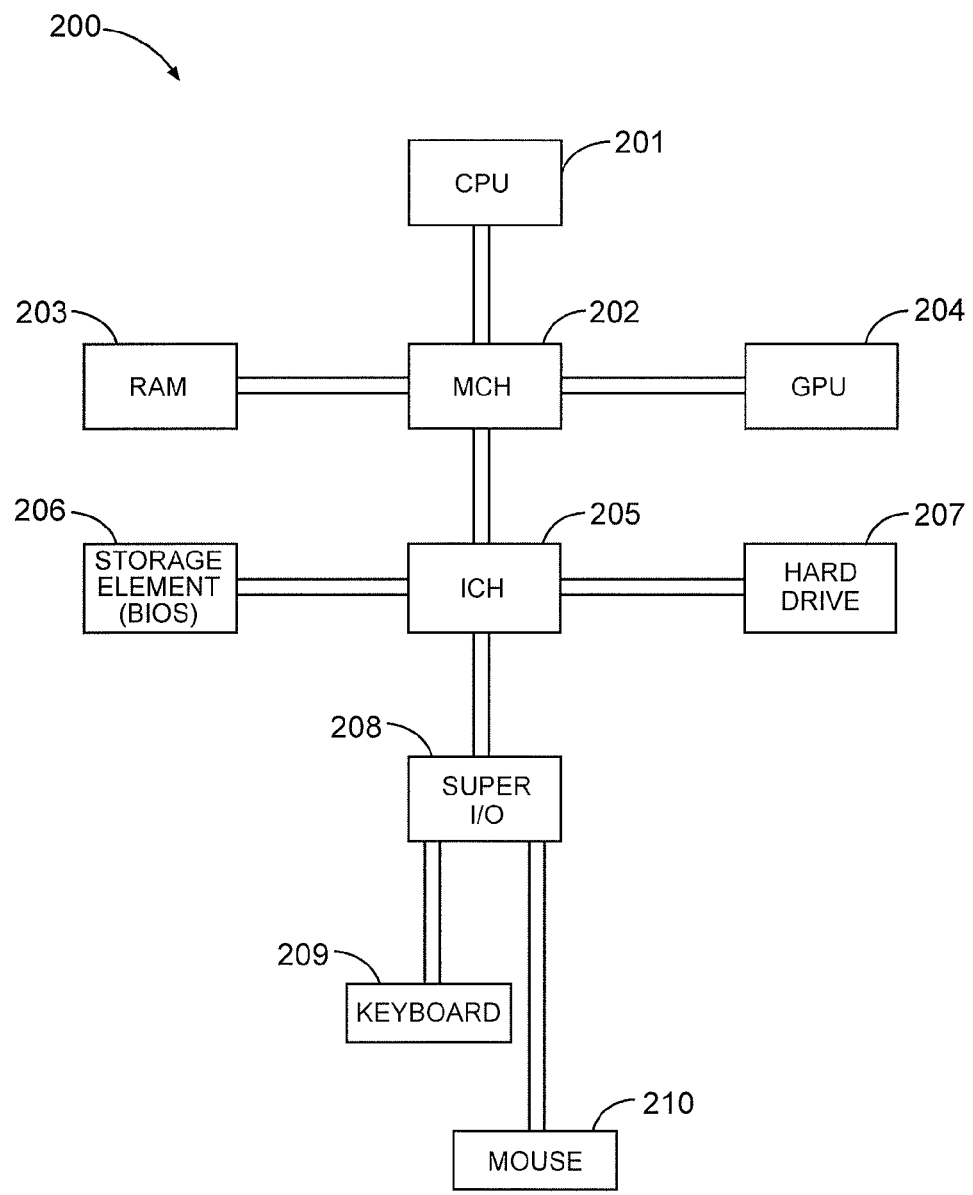
FIG. 2 is a diagram illustrating an example information handling system, according to aspects of the present disclosure.

FIG. 2 is a diagram illustrating an example information handling system 200, according to aspects of the present disclosure. The control unit 104 may take a form similar to the information handling system 200. A processor or CPU 201 of the information handling system 200 is communicatively coupled to a memory controller hub or north bridge 202. Memory controller hub 202 may include a memory controller for directing information to or from various system memory components within the information handling system 200, such as RAM 203, storage element 206, and hard drive 207. The memory controller hub 202 may be coupled to RAM 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

According to aspects of the present disclosure, the time-varying signal transmitted into the formation by the transmitter may comprise an asymmetric time-varying signal. A time-varying signal may be asymmetric if it has asymmetry between the intensity of the upward and downward signal movement. The asymmetric time-varying signal may comprise, for example, at least one of shaped pulses, a triangular wave, and a sinusoidal wave. When a symmetric signal, such as a single-frequency sinusoid, is used to induce a magnetic field on the target well, the direction of the target well relative to the relief well may only be known with an ambiguity of 180°. That is because traditionally no phase synchronization exists between the transmitter and receiver due to the difficulty of such a connection, and as a result the sign of its amplitude at a given time may be unresolvable at the relief well. In other words, with symmetric signals, it is not possible to distinguish a case with one signal phase and target azimuth, from another case with 180° off signal phase with 180° target azimuth. By using an asymmetric signal, as described below, the sign of the received magnetic field may be resolved and the direction of the target well to be accurately determined.

Figure 4:
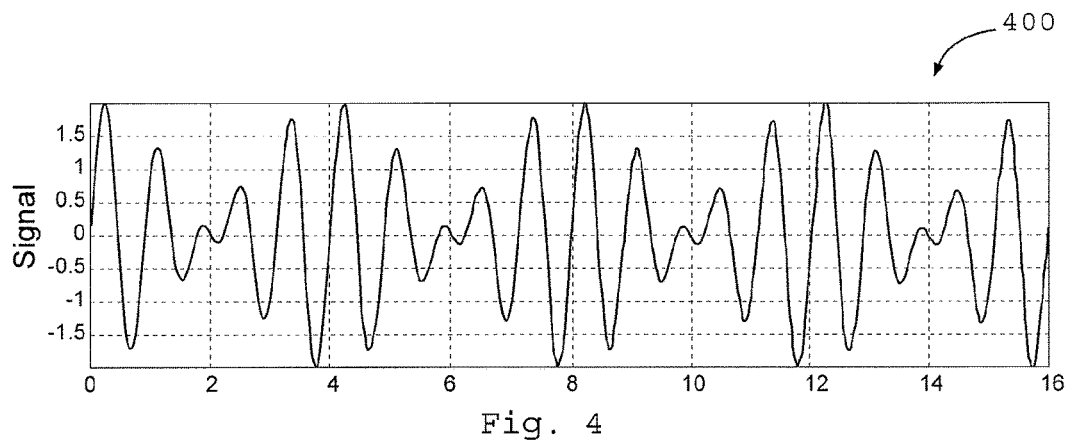
FIG. 4 is a graph illustrating an example asymmetric time-varying signal, according to aspects of the present disclosure.

FIG. 4 is a graph illustrating an example asymmetric time-varying signal 400 plotted in terms of signal amplitude and time, according to aspects of the present disclosure. In the embodiment shown, the asymmetric time-varying signal 400 comprises a modulated sinusoidal signal that combines two time-varying sinusoidal signals with different frequencies. In particular, the asymmetric time-varying signal 300 comprises a ranging signal component with a first frequency and a sign identification signal component with a second frequency. As used herein, the ranging signal component may be the primary signal used to induce the magnetic field on the target well. Likewise, the sign identification signal component may be used to identify the sign the magnetic field received at the receiver. Both the ranging signal component and the sign identification signal component may comprise symmetric sinusoids that create an asymmetric time-varying signal when added together. The signal characteristics of the asymmetric time-varying signal 400 may comprise at least one of the first frequency, the second frequency, an amplitude of the ranging signal component, and an amplitude of the sign identification signal component, a phase of the ranging signal component; a phase of the sign identification signal component; and a phase difference between the ranging signal component and the sign identification signal component.

In certain embodiments, the second frequency may be a non-integer multiple of the first frequency. This may allow for the frequencies to be closer together and affected less by the frequency response of the formation and tool electronics. The formation, transmitter, receiver, and target well may have frequency responses that interact differently with signals of different frequencies. The farther the first and second frequencies are set apart, the more likely the signals are to be affected differently by the various frequency responses. Using a non-integer multiple between the first and second frequencies allow for the frequencies to be closer together and more likely to be similarly affected by the frequency response of the formation. This may reduce errors during the identification of one or more of the sign or amplitude, amplitude ratio, and phase or phase difference of the different frequency signals.

Figure 5:
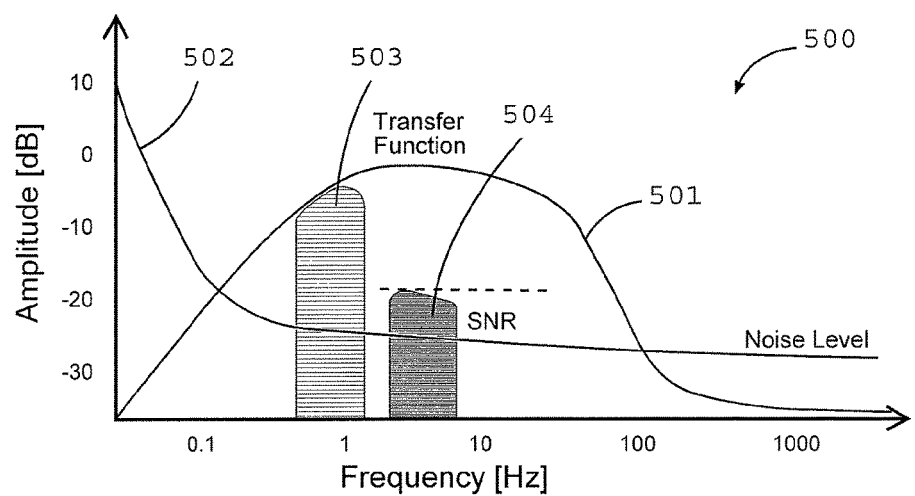
FIG. 5 is a graph illustrating example downhole characteristics with respect to an asymmetric time-varying signal, according to aspects of the present disclosure.

As described above, the signal characteristics may be based at least in part on a downhole characteristic. FIG. 5 is a graph 500 illustrating example downhole characteristics with respect to an asymmetric time-varying signal, according to aspects of the present disclosure. The graph 500 plots the downhole characteristics and asymmetric time-varying signal in terms of amplitude in decibels and frequency in hertz (Hz). In particular, the graph 500 illustrates an example frequency transfer function 501, an example noise level 502, an example ranging signal component 503, and an example sign identification signal component 504. The frequency transfer function 501 may comprise the combined frequency response of a transmitter, a receiver, and a formation in a given ranging operation. In the embodiment shown, the frequency transfer function 501 acts as a band pass filter, with frequencies between about 1 and 50 Hz being transmitted without significant amplitude attenuation, and frequencies above and below those ranges being attenuated. The noise level 502 identifies the noise within the borehole/formation by its frequency component. The noise may be caused, for example, by actions within the target well—e.g., rushing hydrocarbons from a blowout—action in the relief well—e.g., drilling operations—ambient noise within the formation and electronic system noise. In the embodiment shown, the noise level 502 is higher, approximately 10 decibels, at low frequencies and is generally lower at higher frequencies.

In certain embodiments, the signal characteristics of an asymmetric time-varying signal may be determined or modified according to the downhole characteristics represented in FIG. 5. For example, the frequencies of the ranging signal component 503 and the sign identification signal component 504 may be selected such that they fall within the band pass of the transfer function 501. Likewise, the amplitude of each of the ranging signal component 503 and the sign identification signal component 504 may be optimized according to the noise level 502. In certain embodiments, the amplitudes of the ranging signal component 503 and the sign identification signal component 504 may be inversely related. This may be caused by a limited power source being used to transmit both the ranging signal component 503 and the sign identification signal component 504 into the formation.

In certain embodiments, a signal-to-noise ratio necessary to induce the magnetic field on the target well and receive the induced magnetic field may be determined. The amplitude of the sign identification signal component 504 may be determined based at least in part on the signal-to-noise ratio, and the remaining power may be devoted to transmission of the ranging signal component 504. In relatively quiet systems, for example, most power from a power source may be devoted to the ranging signal component 503, increasing the distance that the asymmetric time-varying signal will penetrate to the formation while still providing sign resolution at the receiver. In contrast, in relatively noisy system, more power can be devoted to the sign identification signal component, ensuring that the receiver can resolve the direction of the target.

In addition to the downhole characteristics shown in FIG. 5, signal characteristics of asymmetric time-varying signals may be based at least on part on frequency response of the target object. For example, different targets may have different frequency response characteristics. In particular, signals from the downhole casing may be small for very low frequencies and also for very high frequencies. If the frequency response of the target is known, its frequency spectrum can be modeled and the frequency of the asymmetric time-varying signal may be selected or altered accordingly. Alternatively, the frequency of the asymmetric time-varying signal may be based on a downhole characteristic that is recovered from a previous measurement. For example, frequencies with very small magnitude responses can be increased in magnitude in the excitation, while the opposite may done for frequencies with larger magnitude response for both ranging signal and signal identification signal components.

In certain embodiments, a sampling rate of the induced magnetic field may be determined based on at least one frequency of the asymmetric time-varying signal. The sampling rate may correspond to the number of measurements taken by the receiver. When the first or second frequencies of the respective ranging signal and sign identification signal components change, the sampling rate of the receiver may also be modified such that a sufficient number of samples are taken to accurately reflect the content of the induced magnetic field.

In certain embodiments, determining the sampling rate of the induced magnetic field based on at least one frequency of the asymmetric time-varying signal may include reducing the sampling rate to a rate below the rate dictated by the Nyquist criterion. By reducing the number of samples, power usage may be reduced as can the data load transmitted to the surface. As described above, data transmission to the surface may take place through a limited bandwidth telemetry system. Reducing the number of samples reduces the data load that must be transmitted and may increase the speed with which the ranging measurements and calculations are completed.

In certain embodiments, determining the sampling rate of the induced magnetic field based on at least one frequency of the asymmetric time-varying signal may include solving Equation (7):

$$\arg\min_{A,B,\phi} \left( \sum_{n=1}^{N} \left( x[n] - \int_{\tau=-0.5}^{\tau=0.5} K(\tau)(A\sin(\omega_1(n+\tau)\Delta t - \phi) + B\sin(\omega_2(n+\tau)\Delta t - \phi))d\tau \right)^2 \right)$$

wherein N is the number of samples, n is the sample index, $\omega_1$ and $\omega_2$ are the ranging signal and sign identification signal frequencies in radians, respectively; A and B are the ranging signal and sign identification signal amplitudes, respectively; $\Delta t$ if the period of one sample, $\varphi$ is the relative phase between sampling system and excitation system (may or may not be known); $K(\tau)$ is the sampling kernel based on the particular analog to digital converter system used. Depending on the embodiment, $\varphi$ may or may not be known. If $\varphi$ is known, it can be used as a known constant rather than a variable in the minimization problem. In order to achieve a unique solution, $1/\Delta t$ should not be close to an integer multiple of frequencies $\omega_1$ and $\omega_2$.

Aspects of the present disclosure may be used both when a drilling assembly is rotating in a conventional drilling operation, and when the drilling assembly is stationary. As described above, the transmitter and receiver may be coupled to a drilling assembly that is disposed within a borehole. In embodiments where measurements are taken while the drilling assembly is rotating, the sampling rate may be modified to coincide with the rotation rate of the drilling assembly. This may ensure that the part of the noise due to drilling appears in the received signal as a constant baseline shift which can be removed by high pass filtering. Furthermore, this allows removal of azimuthal variations in the received signal due to rotation which may be undesirable based on the application.

Additionally, the sampling rate may be adjusted, for example, based on any measurement of tool orientation such as magnetometer or accelerometer measurements. Likewise, the sampling rate may be modified to account for slip-stick in the drill bit, to ensure azimuthally sound measurements. Based on the measured drill bit position, velocity or acceleration, the sampling rate can be adjusted to maintain a constant spatial sampling rate. For example, in a slip condition sampling rate can be increased, or in the stick condition sampling rate can be decreased. It is also possible to realize the above methodologies synthetically by applying an equivalent correction algorithm on a constant temporal sampling data.

Figure 6:
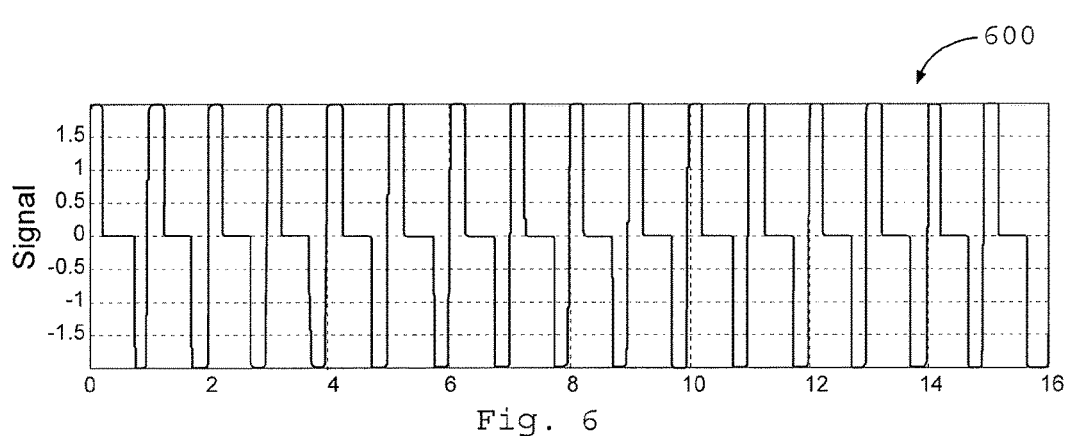
FIG. 6 is a graph illustrating an example asymmetric time-varying signal, according to aspects of the present disclosure.

FIG. 6 is a graph illustrating an example asymmetric time-varying signal 600, according to aspects of the present disclosure. Unlike signal 400, which is sinusoidal, the signal 600 comprises a plurality of pulses shaped with asymmetric behavior. The shaped pulse signal may be characterized by signal characteristics such as maximum, minimum and negative to positive transition width. Like the sinusoidal signals, the pulses are expected to be affected by downhole characteristics like the frequency transfer function of the transmitter, receiver and the formation. In certain embodiments, the pulses may be designed to negate the band-pass effects described above by using very high amplitudes at very low and very high frequencies. This may reduce the distortions in the shape of the received signal to allow better sign detection operation at higher noise levels. Additionally, the pulse may be separated from the noise spectrum by making a measurement of the noise real-time and amplifying frequencies that are less affected by it.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for performing ranging measurements within a formation, comprising:
    transmitting an asymmetric time-varying signal from a transmitter disposed within a borehole in the formation, wherein the asymmetric time-varying signal comprises a signal characteristic that is based at least in part on a downhole characteristic;
    measuring at a receiver disposed within the borehole a magnetic field induced on an object within the formation by the asymmetric time-varying signal; and
    determining a direction to the object from the borehole based at least in part on the measurement of the induced magnetic field, wherein the measurement comprises a measurement of a spatial change in the magnetic field in a direction that has a component in a radial direction;
    determining a sampling rate of the induced magnetic field based on at least one frequency of the asymmetric time-varying signal, wherein the asymmetric time-varying signal comprises a ranging signal component with a first frequency and a sign identification component with a second frequency, wherein determining the sampling rate of the induced magnetic field comprises solving the following equation:

$$\arg\min_{A,B,\phi} \left( \sum_{n=1}^{N} \left( x[n] - \int_{\tau=-0.5}^{\tau=0.5} K(\tau)(A\sin(\omega_1(n+\tau)\Delta t - \phi) + B\sin(\omega_2(n+\tau)\Delta t - \phi))d\tau \right)^2 \right)$$

wherein N is the number of samples, n is the sample index, $\omega_1$ and $\omega_2$ are the first frequency and the second frequency in radians, respectively, A is an amplitude of the ranging signal component, B is an amplitude of the sign identification signal component, $\Delta t$ is a period of one sample, $\varphi$ is a relative phase between the transmitter and the receiver, and $K(\tau)$ is a sampling kernel of an analog to digital converter system.

2. The method of claim 1, wherein
    the asymmetric time-varying signal comprises at least one of shaped pulses, a triangular wave, and a sinusoidal wave; and
    the signal characteristic comprises at least one of a frequency, a shape, and an amplitude of the asymmetric time-varying signal.

3. The method of claim 1, wherein
    the second frequency is a non-integer multiple of the first frequency.

4. The method of claim 3, wherein the downhole characteristic comprises at least one of a noise level within the formation, a frequency transfer function of the transmitter, the receiver, and the formation, and a frequency response of the object.

5. The method of claim 4, wherein the signal characteristic comprises at least one of:
    the first frequency;
    the second frequency;
    the amplitude of the ranging signal component;
    the amplitude of the sign identification signal component;
    an amplitude ratio of the ranging signal component to the sign identification component signal component;
    a phase of the ranging signal component;
    a phase of the sign identification signal component; and
    a phase difference between the ranging signal component and the sign identification signal component.

6. The method of claim 5, wherein
    the amplitude of the ranging signal component and the amplitude of the sign identification signal component are inversely related; and
    the amplitude of the sign identification signal component is determined based at least in part on a pre-determined signal-to-noise ratio.

7. The method of claim 1, wherein
    the transmitter and the receiver are coupled to a drilling assembly disposed within the borehole; and
    measuring at the receiver the induced magnetic field comprises determining a sampling rate of the induced magnetic field based on a rate of rotation of the drilling assembly.

8. The method of claim 1, further comprising using the time-varying signal to induce the magnetic field on a portion of a bottom hole assembly of a drilling assembly disposed within the borehole.

9. A system for performing ranging measurements within a formation, comprising:
    a transmitter;
    a receiver;
    a processor communicably coupled to the transmitter and the receiver; and
    a memory device coupled to the processor, wherein the memory device contains a set of instructions that, when executed by the processor cause the processor to:
        command the transmitter to transmit into the formation an asymmetric time-varying signal, wherein the asymmetric time-varying signal comprises a signal characteristic that is based at least in part on a downhole characteristic;
        command the receiver to measure a magnetic field induced on an object within the formation by the asymmetric time-varying signal;
        determine a direction to the object from a borehole based at least in part on the measurement of the induced magnetic field, wherein the measurement comprises a measurement of a spatial change in the magnetic field in a direction that has a component in a radial direction;
        determine a sampling rate of the induced magnetic field based on at least one frequency of the asymmetric time-varying signal, wherein the asymmetric time-varying signal comprises a ranging signal component with a first frequency and a sign identification component with a second frequency, wherein determining the sampling rate of the induced magnetic field comprises solving the following equation:

$$\arg\min_{A,B,\phi} \left( \sum_{n=1}^{N} \left( x[n] - \int_{\tau=-0.5}^{\tau=0.5} K(\tau)(A\sin(\omega_1(n+\tau)\Delta t - \phi) + B\sin(\omega_2(n+\tau)\Delta t - \phi))d\tau \right)^2 \right)$$

wherein N is the number of samples, n is the sample index, $\omega_1$ and 107 $_2$ are the first frequency and the second frequency in radians, respectively, A is an amplitude of the ranging signal component, B is an amplitude of the sign identification signal component, $\Delta t$ is a period of one sample, $\varphi$ is a relative phase between the transmitter and the receiver, and K(τ) is a sampling kernel of an analog to digital converter system.

10. The system of claim 9, wherein
the asymmetric time-varying signal comprises at least one of shaped pulses, a triangular wave, and a sinusoidal wave; and
the signal characteristic comprises at least one of a frequency, a shape, and an amplitude of the asymmetric time-varying signal.

11. The system of claim 9, wherein
the second frequency is a non-integer multiple of the first frequency.

12. The system of claim 11, wherein the downhole characteristic comprises at least one of a noise level within the formation, a frequency transfer function of the transmitter, the receiver, and the formation and a frequency response of the object.

13. The system of claim 12, wherein the signal characteristic comprises at least one of:
the first frequency;
the second frequency;
the amplitude of the ranging signal component;
the amplitude of the sign identification signal component;
an amplitude ratio of the ranging signal component to the sign identification component signal component;
a phase of the ranging signal component;
a phase of the sign identification signal component; and
a phase difference between the ranging signal component and the sign identification signal component.

14. The system of claim 13, wherein
the amplitude of the ranging signal component and the amplitude of the sign identification signal component are inversely related; and
the amplitude of the sign identification signal component is determined based at least in part on a pre-determined signal-to-noise ratio.

15. The system of claim 9, wherein
the transmitter and the receiver are coupled to a drilling assembly disposed within the borehole; and
measuring at the receiver the induced magnetic field comprises determining a sampling rate of the induced magnetic field based on a rate of rotation of the drilling assembly.

16. The system of claim 9, wherein the set of instructions that, when executed by the processor further cause the processor to identify an azimuthal drilling direction of to a drilling assembly disposed within the borehole.

* * * * *